United States Patent
Narasimha et al.

(10) Patent No.: US 10,159,108 B2
(45) Date of Patent: Dec. 18, 2018

(54) DRX HANDLING IN LTE LICENSE ASSISTED ACCESS OPERATION

(71) Applicant: MOTOROLA MOBILITY LLC, Chicago, IL (US)

(72) Inventors: Murali Narasimha, Vernon Hills, IL (US); Vijay Nangia, Algonquin, IL (US); Ajit Nimbalker, Buffalo Grove, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/073,135

(22) Filed: Mar. 17, 2016

(65) Prior Publication Data
US 2017/0265248 A1 Sep. 14, 2017

Related U.S. Application Data

(60) Provisional application No. 62/146,213, filed on Apr. 10, 2015.

(51) Int. Cl.
*H04W 76/28* (2018.01)
*H04W 52/02* (2009.01)
(Continued)

(52) U.S. Cl.
CPC ........... *H04W 76/28* (2018.02); *H04W 16/14* (2013.01); *H04W 52/0216* (2013.01); *H04W 74/0808* (2013.01); *H04L 5/001* (2013.01); *H04L 5/0098* (2013.01); *H04W 84/042* (2013.01); *Y02D 70/00* (2018.01); *Y02D 70/1262* (2018.01);
(Continued)

(58) Field of Classification Search
CPC .............. H04W 76/048; H04W 16/14; H04W 74/0808; H04W 84/042; H04W 76/28; H04W 52/0216; Y02D 70/24; Y02D 70/1262; Y02D 70/23; Y02D 70/1264; Y02D 70/142; Y02D 70/25; Y02D 70/00; H04L 5/0098; H04L 5/001
See application file for complete search history.

(56) References Cited

U.S. PATENT DOCUMENTS 9,531,512 B2 * 12/2016 Luo .................. H04L 5/0035
9,681,488 B2 * 6/2017 Kim .................. H04W 76/048
(Continued)

FOREIGN PATENT DOCUMENTS

WO WO 2012013215 A1 * 2/2012 ........ H04W 72/1247
WO 2016072787 A1 5/2016

OTHER PUBLICATIONS

Nokia Corporation, et al. "Overview of Possible LAA Impact to RAN2", 3GPP draft; R2-150188 Overview of Possible LAA Impacts to RAN2, 3rd Generation Partnership Project, vol. RAN WG2, No. 20150209, www.3gpp.org/ftp/Meetings_3GPP_SYNC/RAN2/Docs, XP050935534, Feb. 8, 2015.

*Primary Examiner* — Tejis Daya
(74) *Attorney, Agent, or Firm* — Matthew C. Loppnow; The Watson I.P. Group, PLC

(57) ABSTRACT

Methods and structures are disclosed which facilitate handling discontinuous reception (DRX) in Long Term Evolution (LTE) type communication signal reception and transmission using one carrier, such as a licensed carrier, and another carrier, such as an unlicensed carrier, in the presence of other transmissions using the other carrier.

34 Claims, 6 Drawing Sheets

(51) Int. Cl.
   *H04W 16/14*   (2009.01)
   *H04W 74/08*   (2009.01)
   *H04L 5/00*    (2006.01)
   *H04W 84/04*   (2009.01)

(52) U.S. Cl.
   CPC ........ *Y02D 70/1264* (2018.01); *Y02D 70/142* (2018.01); *Y02D 70/23* (2018.01); *Y02D 70/24* (2018.01); *Y02D 70/25* (2018.01)

(56) References Cited

U.S. PATENT DOCUMENTS

| | | | |
|---|---|---|---|
| 2010/0067473 A1 | 3/2010 | Cave et al. | |
| 2010/0322173 A1* | 12/2010 | Marinier | H04W 76/048 370/329 |
| 2011/0021230 A1* | 1/2011 | Moberg | H04L 1/0027 455/507 |
| 2011/0317627 A1* | 12/2011 | Kato | H04L 5/0007 370/328 |
| 2013/0210422 A1* | 8/2013 | Pani | H04W 48/16 455/423 |
| 2013/0242833 A1* | 9/2013 | Ahn | H04W 72/082 370/311 |
| 2014/0133415 A1* | 5/2014 | Damnjanovic | H04W 52/146 370/329 |
| 2014/0378157 A1* | 12/2014 | Wei | H04W 16/14 455/454 |
| 2015/0131504 A1* | 5/2015 | Lin | H04W 52/0225 370/311 |
| 2015/0163824 A1* | 6/2015 | Krzymien | H04W 28/18 370/338 |
| 2015/0245411 A1* | 8/2015 | Damnjanovic | H04W 16/14 370/328 |
| 2015/0305083 A1* | 10/2015 | Heo | H04W 52/0258 370/329 |

* cited by examiner

DRX HANDLING IN LTE LICENSE ASSISTED ACCESS OPERATION

CROSS-REFERENCE TO RELATED APPLICATIONS

This application claims the benefit under 35 U.S.C. § 119(e) of U.S. Provisional Application No. 62/146,213, filed Apr. 10, 2015, which application is hereby incorporated by reference in its entirety.

TECHNICAL FIELD

The following disclosure relates to wireless telecommunication transmissions using an unlicensed carrier, and particularly relates to approaches for handling discontinuous reception (DRX) in Long Term Evolution (LTE) type communication signal reception and transmission using one carrier, such as a licensed carrier, and another carrier, such as an unlicensed carrier, in the presence of other transmissions using the other carrier.

BACKGROUND

LTE Advanced is being considered for deployment in the unlicensed spectrum in the 5 GHz band. To do so, licensed spectrum (e.g., in the range 400 MHz to 3.8 GHz) and spectrum in unlicensed spectrum bands would be aggregated together in the same way that the licensed spectrum bands are treated in standard LTE Advanced carrier aggregation (CA). Regulatory authorities around the world have defined or are defining a wide variety of requirements so that various systems can inter-operate or coexist with incumbent users in the unlicensed bands, notably including WiFi deployments.

For LTE Advanced (LTE Release 10-12) carrier aggregation (CA) or Dual Connectivity, an eNB (E-UTRAN Node B or "evolved Node-B") may be used. An eNB is connected to a mobile phone network that communicates with mobile handsets (i.e., "user equipment" or UEs) and that configures a secondary serving cell (Scell) to the UE to provide additional frequency resources (i.e., a secondary carrier or a secondary component carrier (CC)) for communication in addition to the primary serving cell (Pcell). The Scell is typically activated for a UE at the onset of a data burst transmission for the UE and deactivated after the transmission is complete. Activation is done by using an activation command MAC layer control element (MAC CE). Deactivation is done either upon expiry of a deactivation timer or by using an explicit deactivation command MAC CE. Additionally, a UE operating in an Advanced LTE (LTE Release 12) network can expect at least discovery signals from the eNB on the Scell carrier while the carrier is deactivated. After receiving an activation command for the Scell, the UE expects cell specific reference signal (CRS) transmissions from the eNB on the Scell carrier beginning during the subframe in which the activation command is received until the subframe in which the Scell is deactivated.

For further Advanced LTE (LTE Release 13) Scell, operation on unlicensed carriers continues to be studied. The initial focus of the studies is Scell operation via a CA mechanism. However, it has been perceived that some of the procedures identified for CA can also be reused for dual connectivity (i.e., when the Scell and Pcell belong to different cell groups).

Due to regulatory requirements, and due to the need to for LTE Advanced to co-exist with other wireless systems (e.g., Wi-Fi), LTE devices (i.e., UEs and eNBs) need to take several issues into account while operating on an unlicensed carrier frequency (i.e., using License Assisted Access LTE, or "LAA LTE").

First, before transmitting on an unlicensed carrier, the LTE devices (e.g., eNB) typically have to check whether the carrier (i.e., the carrier frequency) is busy using some form of 'listen before talk' (LBT) mechanism, then an LTE device can begin transmissions only if the carrier is free. LBT typically includes measuring the energy on the carrier (sometimes referred to as sensing) for a short duration (e.g., 9 us or 20 us) and determining whether the measured energy is less than a threshold (e.g., −82 dBm or −62 dBm). If the energy is less than the threshold, the carrier is determined to be free. Some examples of LBT include the CCA-ED (clear channel assessment-energy detect) and CCA-CS (clear channel assessment-carrier sense) mechanisms defined in IEEE 802.11 specifications, and CCA mechanisms specified in ETSI EN 301 893 specification.

Second, transmissions on the carrier typically also have to follow discontinuous transmission requirements (DCT requirements), i.e., the LTE device can continuously transmit for only Xms (e.g., X=4 ms as per regulations for some regions, and up to 13 ms per regulations for other regions), after which it has to cease transmission for some duration (sometimes referred to as the idle period), then perform LBT, and reinitiate transmission only if the LBT procedure is successful (i.e., the LBT procedure indicates that the carrier is not busy). The device may perform LBT towards the end of the idle period.

As a result, mechanisms are needed to enable more efficient wireless network operation in both the licensed and unlicensed carrier spectrums.

BRIEF DESCRIPTION OF THE DRAWINGS

For a more complete understanding, reference is now made to the following description taken in conjunction with the accompanying Drawings in which.

DETAILED DESCRIPTION

Figure 1:
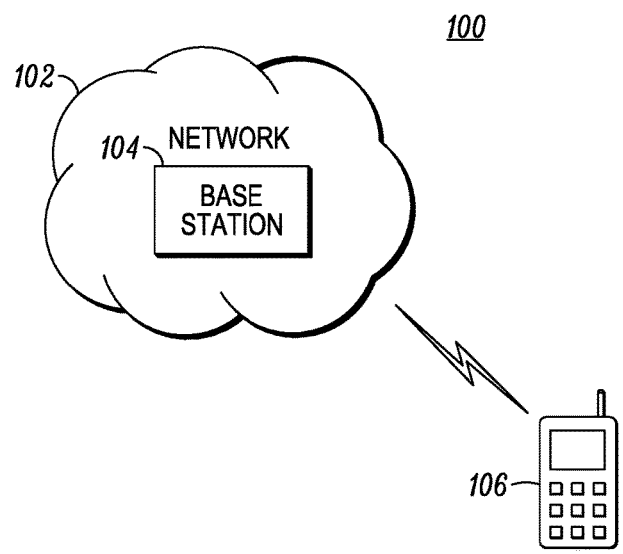
FIG. 1 illustrates a communications system in accordance with various invention embodiments.

Embodiments will now be described more fully hereinafter with reference to the accompanying drawings, in which various embodiments of the invention are shown. This invention may, however, be embodied in many different forms and should not be construed as limited to the embodiments set forth herein; rather, these embodiments are provided so that this disclosure will be thorough and complete, and will fully convey pertinent aspects of the invention to those skilled in the art.

As will be explained and discussed in more detail below, various embodiments provide enhancements or modifications to the creation and reception of LTE signals and channels in order to enable improved operation in both licensed and unlicensed frequency spectrums.

In one embodiment, a method in a mobile device for communicating data packets with a first cell operating on an unlicensed carrier is provided. In some embodiments, the method includes: monitoring, in the mobile device, for a signal addressed to the mobile device from the first cell during an active time having an initial duration equal to an initial active time; extending, in the mobile device, the active time in response to a determination that the unlicensed carrier is occupied during at least a portion of the initial active time; and communicating a data packet between the mobile device and the first cell during the extended active time when the unlicensed carrier is not otherwise occupied.

In some embodiments, the communicating a data packet between the mobile device and the first cell includes: receiving, from the first cell, a control channel indicating a transmission of a data channel to the mobile device; and decoding, in the mobile device, the data packet from the data channel.

In some embodiments, the communicating a data packet between the mobile device and the first cell includes: receiving, from the first cell, a control channel indicating resources for transmission of a data packet by the mobile device; and transmitting the data packet using the indicated resources.

In some embodiments, the method also includes further extending, in the mobile device, the extended active time in response to a determination that the unlicensed carrier is occupied during at least a portion of the extended active time subsequent to the initial active time.

In some embodiments, the determination that the unlicensed carrier is occupied is based upon a clear channel assessment (CCA), performed in the mobile device, that the unlicensed carrier is occupied, and the communicating a data packet between the mobile device and the first cell comprises receiving the data packet from the first cell. In some embodiments the CCA performed in the mobile device utilizes a CCA threshold that is more aggressive than a CCA threshold utilized by the first cell to perform a corresponding CCA at substantially the same time.

In some embodiments, the method also includes: determining whether the unlicensed carrier is occupied at or prior to each subframe in the initial active time; and extending the active time by one subframe for each subframe of the initial active time during which the unlicensed carrier is occupied.

In some embodiments, the extended active time is applied to operation with all configured cells for the mobile device. In some embodiments, the extended active time is applied only to operation with the first cell.

In some embodiments, the determination that the unlicensed carrier is occupied comprises receiving, by the mobile device, a command to extend the active time based upon a determination at the first cell that the unlicensed carrier is occupied. In some embodiments, the command is received from a second cell operating on a licensed carrier. In some embodiments, the command is received from the first cell on the unlicensed carrier. In some embodiments, the communicating a data packet between the mobile device and the first cell comprises transmitting the data packet to the first cell in response to receiving a signal addressed to the mobile device from the first cell during the extended active time. In some embodiments, the communicating a data packet between the mobile device and the first cell comprises receiving the data packet from the first cell in response to receiving a signal addressed to the mobile device from the first cell during the extended active time. In some embodiments, the method further includes extending the active time based upon transmission burst configuration signaling received from a base station.

In some embodiments, the method further includes placing at least portions of the mobile device in a reduced power mode at times other than the active time, wherein the active time comprises a discontinuous reception (DRX) active time.

In another method embodiment, a method in a base station for communicating data with a mobile device using an unlicensed carrier is provided. In some embodiments, the method includes: configuring the mobile device with a first cell on an unlicensed carrier and a second cell on a licensed carrier; determining whether the unlicensed carrier is occupied during an active time for the mobile device, said active time having an initial duration equal to an initial active time; transmitting, in response to determining that the unlicensed carrier is occupied during at least a portion of the initial active time, a command to the mobile device to extend the active time; and then communicating, during the extended active time, a data packet between the mobile device and the first cell when the unlicensed carrier is not otherwise occupied.

In some embodiments, the method further includes transmitting, in response to determining that the unlicensed carrier is occupied during at least a portion of the extended active time subsequent to the initial active time, a command to the mobile device to further extend the active time.

In some embodiments, the determining that the unlicensed carrier is occupied is based upon a clear channel assessment (CCA), performed in the first cell, that the unlicensed carrier is occupied, and the communicating a data packet between the mobile device and the first cell comprises transmitting the data packet from the first cell to the mobile device. In some embodiments, the CCA performed in the first cell utilizes a CCA threshold that is less aggressive than a CCA threshold utilized by the mobile device to perform a corresponding CCA at substantially the same time.

In some embodiments, the method further includes: determining whether the unlicensed carrier is occupied at or prior to each subframe in the initial active time; and extending the active time by one subframe for each subframe of the initial active time during which the unlicensed carrier is occupied.

In some embodiments, the transmitting, in response to determining that the unlicensed carrier is occupied during at least a portion of the initial active time, a command to all mobile devices configured for the first cell, to extend the respective active time for each such mobile device.

In some embodiments, the command includes an indicated number of subframes to extend the active time. In some embodiments, the command is transmitted to the mobile device from the second cell on the licensed carrier. In some embodiments, the command is transmitted to the mobile device from the first cell on the unlicensed carrier. In some embodiments, the communicating a data packet between the mobile device and the first cell comprises receiving the data packet from the mobile device.

In an apparatus embodiment, a mobile device for communicating data packets with a first cell operating on an unlicensed carrier is provided. In some embodiments, the mobile device includes a transceiver, and a processor coupled to the transceiver. The mobile device is operable to: monitor for a signal addressed to the mobile device from the first cell during an active time having an initial duration equal to an initial active time; extend the active time in response to a determination that the unlicensed carrier is occupied during at least a portion of the initial active time; and communicate, in response to receiving a signal addressed to the mobile device from the first cell during the extended active time, a data packet between the mobile device and the first cell when the unlicensed carrier is not otherwise occupied.

In some embodiments, the mobile device is operable to further extend the extended active time in response to a determination that the unlicensed carrier is occupied during at least a portion of the extended active time subsequent to the initial active time.

In some embodiments, the determination that the unlicensed carrier is occupied is based upon a clear channel assessment (CCA), performed in the mobile device, that the unlicensed carrier is occupied. In some embodiments, the CCA performed in the mobile device utilizes a CCA threshold that is more aggressive than a CCA threshold utilized by the first cell to perform a corresponding CCA at substantially the same time.

In some embodiments, the mobile device is operable to determine whether the unlicensed carrier is occupied at or prior to each subframe in the initial active time, and extend the active time by one subframe for each subframe of the initial active time during which the unlicensed carrier is occupied.

In some embodiments, the determination that the unlicensed carrier is occupied comprises receiving, by the mobile device, a command to extend the active time based upon a determination at the first cell that the unlicensed carrier is occupied. In some embodiments, the data packet communicated between the mobile device and the first cell is received from the first cell.

In some embodiments, the mobile device is operable to place at least portions of the mobile device in a reduced power mode at times other than the active time, wherein the active time comprises a discontinuous reception (DRX) active time.

In another apparatus embodiment, a base station for communicating data with a mobile device using an unlicensed carrier is provided. In some embodiments, the base station includes a transceiver, and a processor coupled to the transceiver. The base station is operable to: configure the mobile device with a first cell on an unlicensed carrier and a second cell on a licensed carrier; determine whether the unlicensed carrier is occupied during an active time for the mobile device, said active time having an initial duration equal to an initial active time; transmit, in response to determining that the unlicensed carrier is occupied during at least a portion of the initial active time, a command to the mobile device to extend the active time; and then communicate, during the extended active time, a data packet between the mobile device and the first cell when the unlicensed carrier is not otherwise occupied.

In another method embodiment, a method in a mobile device for receiving data from a first cell operating on an unlicensed carrier is provided. In some embodiments, the method includes: monitoring, in the mobile device, for a signal addressed to the mobile device during a first active time; determining, in the mobile device, that the channel is occupied during at least a portion of the first active time; monitoring, in the mobile device, for a signal addressed to the mobile device for an active time extension period subsequent to the first active time, in response to determining that the channel is occupied; and receiving, in the mobile device, data from the first cell during the active time extension period.

In some embodiments, the determining that the channel is occupied includes determining that the channel is occupied based on a clear channel assessment.

In some embodiments, the first active time is a minimum duration of time for monitoring for a control channel.

In some embodiments, the determining whether the channel is occupied comprises determining whether the channel is occupied at or prior to each subframe in the first active time, and the active time extension period is incremented by one subframe for each subframe of the first active time for which the channel is occupied.

In some embodiments, the active time extension period is applied to operation with all configured cells. In some embodiments, the active time extension period is applied only to operation with the first cell.

In another method embodiment, a method in a mobile device for receiving data from a first cell operating on an unlicensed carrier is provided. In some embodiments, the method includes: configuring a first cell on an unlicensed carrier and a second cell on a licensed carrier; monitoring, in the mobile device, for a first active time, for a signal addressed to the mobile device from the second cell; receiving, in the mobile device, a message on the second cell indicating an extension of active time by an extension duration; monitoring, in the mobile device, for the extension duration subsequent to the first active time, for a signal addressed to the mobile device from the second cell; and receiving, in the mobile device, data from the first cell during the extension duration.

In another method embodiment, a method for transmitting data to a mobile device using unlicensed spectrum is provided. In some embodiments, the method includes: configuring the mobile device with a first cell on an unlicensed carrier and a second cell on a licensed carrier; performing a clear channel assessment of the unlicensed carrier during a first active duration of the mobile device; determining whether the unlicensed carrier is occupied during at least a portion of the first active duration; transmitting, in response to determining that the unlicensed carrier is occupied during at least a portion of the first active duration, a message to the mobile device via the second cell indicating an extension of the first active time by an extension period; and then transmitting data to the mobile device via the first cell during the extension period.

FIG. 1 illustrates a communication system 100 including a network 102, a base station 104, such as an eNB, and a user equipment (UE) 106. The base station may also be referred to as a base unit, an access point (AP), access terminal (AT), Node-B (NB), enhanced Node-B (eNB), relay node, home eNB, pico eNB, femto eNB or by other present or future terminology used in the art for a base station derivation. Various communication devices may exchange data or information through the network 102. The network 102 may be an evolved universal terrestrial radio access (E-UTRA) or other type of telecommunication network. A network entity, such as the base station 104, may assign a UE identifier (UEID) to the UE 106 when the UE 106 first joins the network 102. For one embodiment, the base station 104 may be a distributed set of servers in the network 102. The UE 106 may be one of several types of handheld or mobile communication devices, such as, a mobile phone, a laptop, or a personal digital assistant (PDA). In one embodiment, the UE 106 may be a wireless local area network capable device, a wireless wide area network capable device, or any other wireless (i.e., mobile) device.

Figure 2:
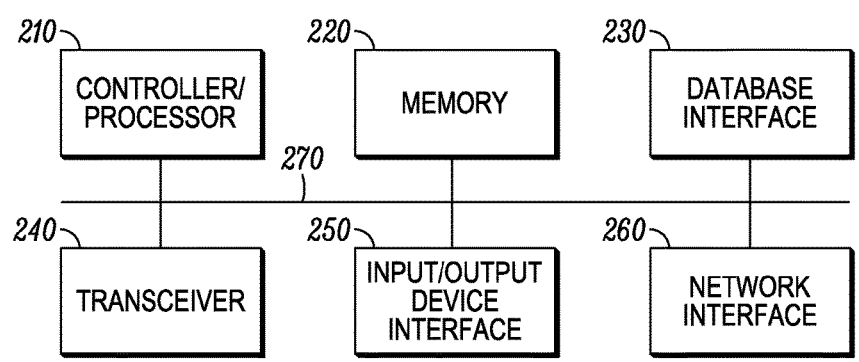
FIG. 2 illustrates a possible configuration of a computing system to act as a base station.

FIG. 2 illustrates a possible configuration of a computing system to act as the base station 104. The base station 104 may include a processor/controller 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The controller/processor 210 may be any programmable processor. Various embodiments of the disclosure may also be implemented or partially implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, solid state drive or other removable memory device that allows media content to be directly uploaded into the system. Data may be stored in the memory 220 or in a separate database (not specifically shown). The database interface 230 may be used by the controller/processor 210 to access the database. The database may contain any formatting data to connect the UE 106 to the network 102. The transceiver 240 may create a data connection with the UE 106. The transceiver 240 may configure a Physical Downlink Control Channel (PDCCH) and a Physical Uplink Control Channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present disclosure. The base station 104 may implement any operating system, such as Microsoft Windows®, LINUX, or UNIX, for example. Client and server software may be written in any programming language, such as C, C++, Java, or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
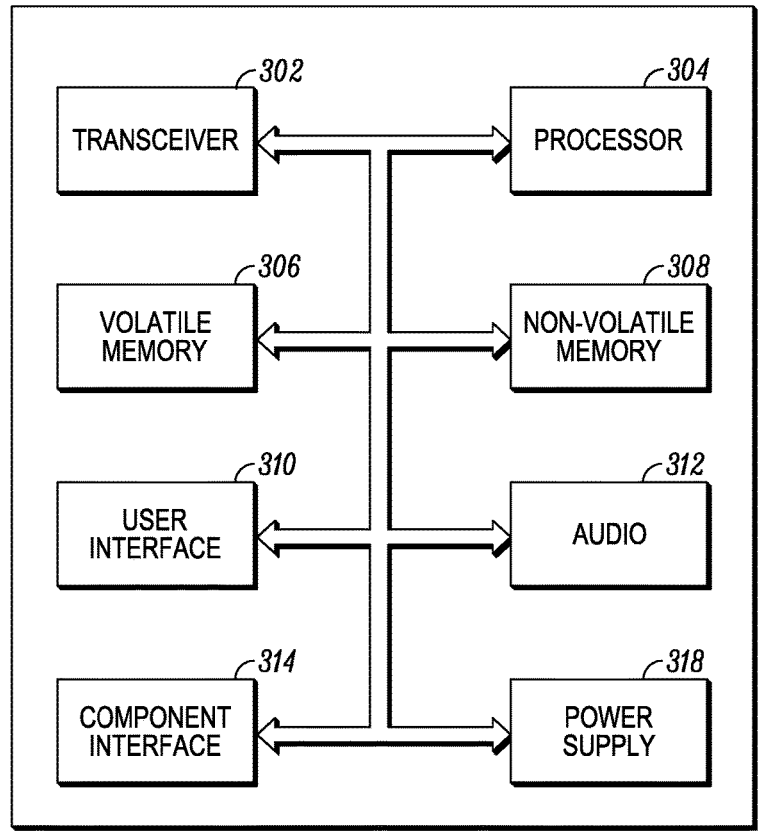
FIG. 3 is a block diagram of an embodiment of a telecommunication apparatus or electronic device that operates as a User Equipment (UE)

FIG. 3 illustrates in a block diagram of one embodiment of a telecommunication apparatus or electronic device to act as the UE 106. The UE 106 may be capable of accessing the information or data stored in the network 102. For some embodiments of the disclosure, the UE 106 may also support one or more applications for performing various communications with the network 102. The UE 106 may be a handheld device, such as, a mobile phone, a laptop, a personal digital assistant (PDA) smart phone or other multifunction communication device. For some embodiments, the UE 106 may be a WiFi capable device, which may be used to access the network 102 for data or by voice using VOIP and WiFi carrier frequency spectrums.

The UE 106 may include a transceiver 302, which is capable of sending and receiving data over the network 102. The UE 106 may include a processor 304 that executes stored programs or applications that may, among other things, monitor, control and interact with the other components of the UE 106. The UE 106 may also include a volatile memory 306 and a non-volatile memory 308 which are used by the processor 304. The UE 106 may include a user interface 310 that may comprise user input elements such as a keypad, display, touch screen, and the like. The user interface 310 may also include user output elements that may comprise a display screen and/or vibration and illumination indicators. The UE 106 may also include an audio interface 312 that may comprise elements such as a microphone, earphone, and speaker. The UE 106 also may include a component interface 314 to which additional elements may be attached, for example, a universal serial bus (USB) interface. The UE 106 may include a power supply 316. In addition, the UE 106 may be incorporated as a peripheral or integral part of a larger system such as a transportation vehicle, building, entertainment center, kiosk, or gaming device, to name a few.

In Long Term Evolution (LTE) communication systems, physical layer signals and channels (e.g., a control channel like a physical downlink control channel (PDCCH), enhanced physical downlink control channel (EPDCCH); a data channel like a physical downlink shared channel (PDSCH); reference and synchronization signals like a primary synchronization signal (PSS), secondary synchronization signal (SSS), cell-specific reference signal (CRS), channel state information reference signal (CSI-RS), and discovery signals) are transmitted by a base station 104 using orthogonal frequency-division multiplexed (OFDM) symbols. For normal cyclic prefix (CP) operation, the OFDM symbols are of ~71 us in duration. Seven OFDM symbols may comprise a 0.5 ms slot and two slots may comprise a 1 ms LTE subframe. Therefore, an example of an LTE subframe comprises 14 OFDM symbols. The PDCCH carries resource assignment information for UEs, which is usually contained in the downlink control information (DCI) message. Multiple PDCCHs can be transmitted in a same subframe using Control Channel Elements (CCE), each of which can be nine sets of four resource elements known as Resource Element Groups (REG), which may be distributed across the first 1 to 3 symbols of a subframe or slot within a subframe. For the uplink, Single Carrier Frequency Division Multiple Access (SC-FDMA) or Discrete Fourier Transform Spread OFDM (DFT-SOFDM) is used and the subframe duration is similar to downlink (i.e. 1 ms) and a subframe contains 14 DFT-SOFDM symbols (or referred to as 14 OFDM symbols for brevity). The uplink data and/or control is carried on the physical uplink shared channel (PUSCH). Other channels for uplink transmissions include the physical uplink control channel (PUCCH), physical random access channel (PRACH), and uplink signals include sounding reference symbol (SRS) and uplink demodulation reference signal (DMRS) for demodulating uplink channels.

DRX Handling Issues

As mentioned above, license assisted access to unlicensed spectrum using LTE (LAA-LTE) is being studied in the 3rd Generation Partnership Project (3GPP) as a potential extension of Carrier Aggregation. Compared to conventional LTE in licensed bands, the LAA operation has some specific requirements related to operation in unlicensed bands. The requirements impose some operational differences at both the eNB and the UE in comparison to conventional LTE operation.

Also as mentioned above, LTE devices (i.e., UEs and eNBs) operating on an unlicensed carrier frequency must co-exist with other wireless systems (e.g., Wi-Fi). Thus, an LTE device typically has to check whether the carrier (i.e., the carrier frequency) is busy using some form of 'listen before talk' (LBT) mechanism, then the LTE device can begin transmissions only if the carrier is free. In addition, the LTE device can continuously transmit for only a certain duration, after which it has to cease transmission for an idle period, perform another LBT, and then reinitiate transmission only if LBT is successful. LBT can be performed using a carrier sense or energy detect mechanism such as Clear Channel Assessment (CCA). LBT and CCA are used interchangeably in this disclosure.

Figure 4:
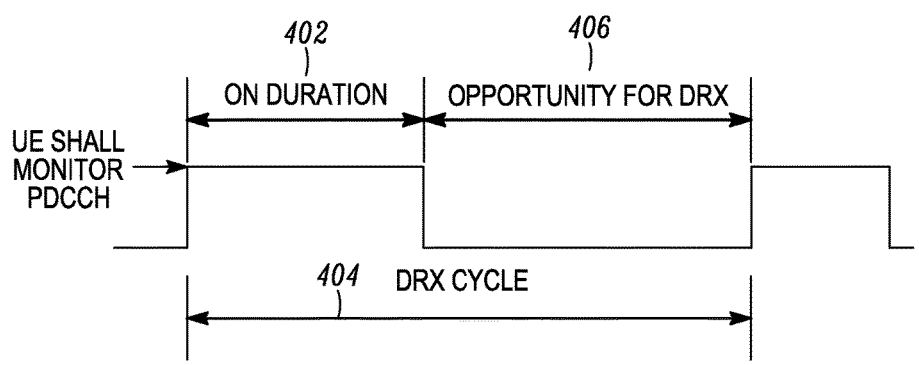
FIG. 4 illustrates a discontinuous reception (DRX) cycle used to save power in LTE communications.

Discontinuous Reception (DRX) is a feature that allows for UE battery savings, by reducing the time periods when the UE actively monitors for a control channel transmitted by the eNB. A DRX cycle refers to a repeating sequence of subframes in which the UE monitors for a control channel in the early part of the sequence and then "sleeps" or "goes into DRX" during the remaining part of the sequence. Referring now to FIG. 4, the DRX On-Duration 402 is the minimum number of subframes at the start of the DRX cycle 404 that the UE is expected to monitor for a control channel addressed to the UE for possible allocations. The DRX Active Time refers to the total duration that a UE is awake and monitors for a control channel addressed to the UE. The active time initially has the same duration as the DRX On-Duration (and may be referred to herein as the "initial active time"), but the active time may be extended beyond the end of the DRX On-Duration to include portions of the DRX opportunity time 406 (which may be referred to herein as the "extended active time" or "active time extension"). When the UE detects a control channel, the active time may be extended to allow for further packet transmission or retransmissions of packets. In such cases, the DRX active time is therefore longer than the DRX On-Duration. The active time includes both the initial active time and the extended active time.

The eNB can configure a UE to operate in DRX, wherein a UE is allowed to wake at particular time durations (e.g., UE wakes up for a 5 ms duration every 640 ms) to listen/receive signals/commands from the network. If the UE receives a control channel during the 5 ms duration (which control channel may indicate that the UE should receive a data packet transmission), the UE continues to monitor the channel for data packets. The UE can continue to monitor the channel for additional data packets until the UE does not receive a control channel for an inactivity time duration. Conversely, if the UE does not receive a control channel during the 5 ms duration, the UE may save battery by turning off its receiver functions for the remaining portion of the DRX cycle.

Consider, as an example, a conventional carrier aggregation operation with a Pcell on carrier-1 and a Scell on carrier-2. When scheduling the UE, the MAC layer in the eNB treats the packets on the two carriers independently. Specifically, the UE maintains separate HARQ (Hybrid Automatic Repeat Request, also known as Hybrid ARQ) entities for each carrier, each controlling multiple HARQ processes. All HARQ transmission and retransmission attempts of a given packet are performed through one HARQ process; as a result, if a HARQ transmission attempt fails on one carrier, the eNB does not perform a HARQ retransmission of the same packet on a different carrier (i.e., channels). Given the use of two independent HARQ entities, there is an implicit partitioning of the data to be transmitted to the UE into two streams: one for transmission via the Pcell and the other for transmission via the Scell. The eNB scheduler takes into account channel state information feedback and other measurement information to determine the relative sizes of the two streams, while trying to ensure that the packets to be transmitted via the Pcell and the Scell can be transmitted within the DRX On-Duration with a high likelihood. That is, the eNB scheduler allocates data for transmission via the two cells based on a certain number of subframes during which it expects that the UE can be scheduled. The same analysis would hold for the case of carrier aggregation with more than 2 cells, including up to 32 or 64 carriers. Examples of such channel state information feedback include Channel Quality Indicator (CQI), Precoding Matrix Indicator (PMI), and Rank indicator (RI). Examples of such other measurement information include Reference Signal Receive Power (RSRP), Reference Signal Receive Quality (RSRQ), and channel measurements based on sounding reference signal.

Figure 5A:
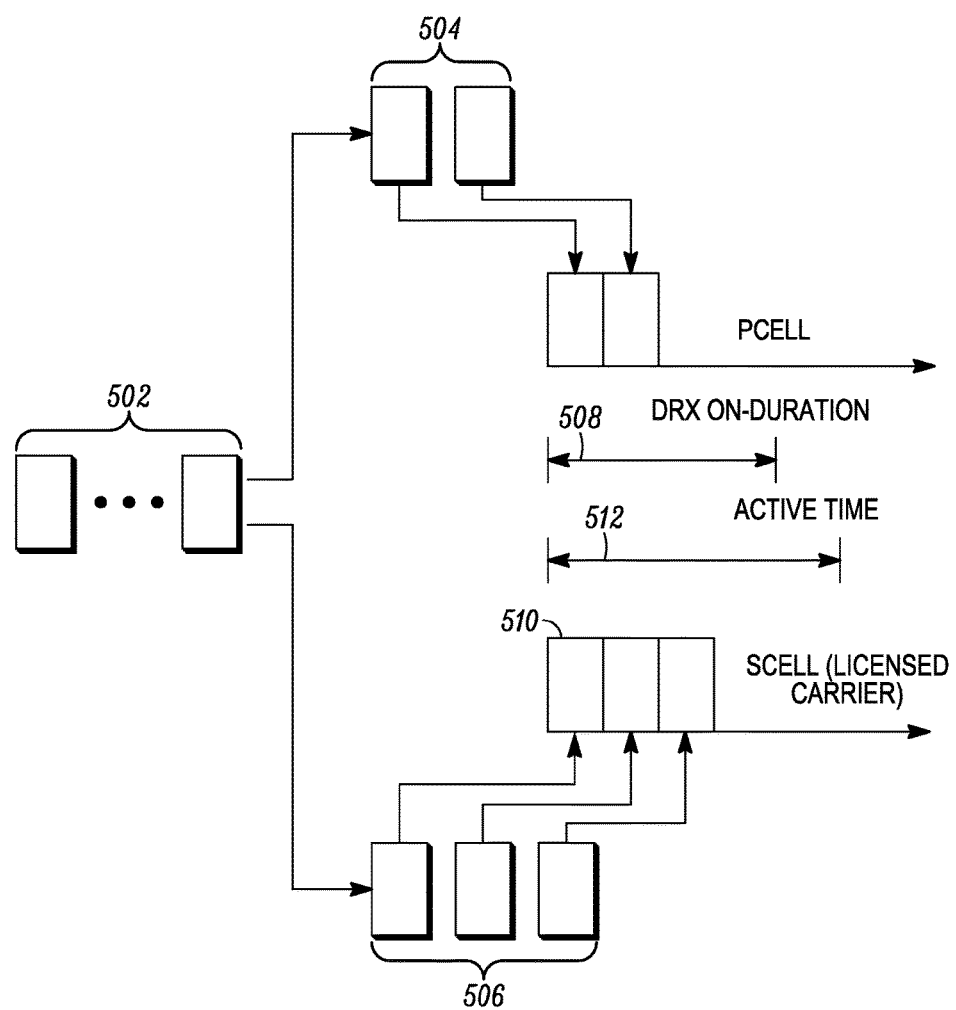
FIG. 5A illustrates normal operation with an Scell on a licensed carrier.

FIG. 5A illustrates the operation with the Scell on a licensed carrier as described above. The data packets 502 to be transmitted to the UE are partitioned by the eNB into data stream 504 for transmission via the Pcell, and data stream 506 for transmission via the Scell. The Scell may be associated with the same eNB as the Pcell, or may be associated with a different eNB. When the UE receives a packet from the Scell (e.g., packet 510) or successfully decodes a control channel (e.g., for a first transmission) from the Scell, it extends the active time 512 in expectation of additional imminent packets from the same Scell. As shown, the active time 512 is longer than the DRX On-Duration 508. Since the eNB controls the allocation of channel resources for both the Pcell and Scell, the packets 506 are successfully transmitted by the Scell to the UE.

However, if the Scell is operated on an LAA-LTE carrier (e.g., an unlicensed carrier) instead of a licensed carrier, there is also the requirement of successful Clear Channel Assessment (CCA) at the Scell before there can be a transmission to the UE (i.e., eNB performs a CCA to determine if the channel is free and then transmits data to the UE when the channel is free), and also discontinuous transmission requirements with limits on maximum channel occupancy time and idle periods to cease transmission before performing another CCA. This can make the partitioning into the first stream 504 and the second stream 506 difficult (e.g., at the eNB), since the eNB scheduler does not have a guaranteed or a deterministic number of subframes that it can expect to be able to schedule on the Scell.

These issues lead to the following problems. First, depending on the channel activity (e.g., other devices that are operating on the unlicensed carrier), the Scell may not be able to drain its buffer quickly. Also, due to there being fewer than the number of expected subframes for scheduling, the DRX active time at the UE could be lengthened, but such would result in increased power requirements. Finally, the On-Duration timer may expire before the Scell drains its buffer, which results in (a) significantly delayed packets, and (b) the Scell having to store the packets for transmission in the next DRX active time.

Figure 5B:
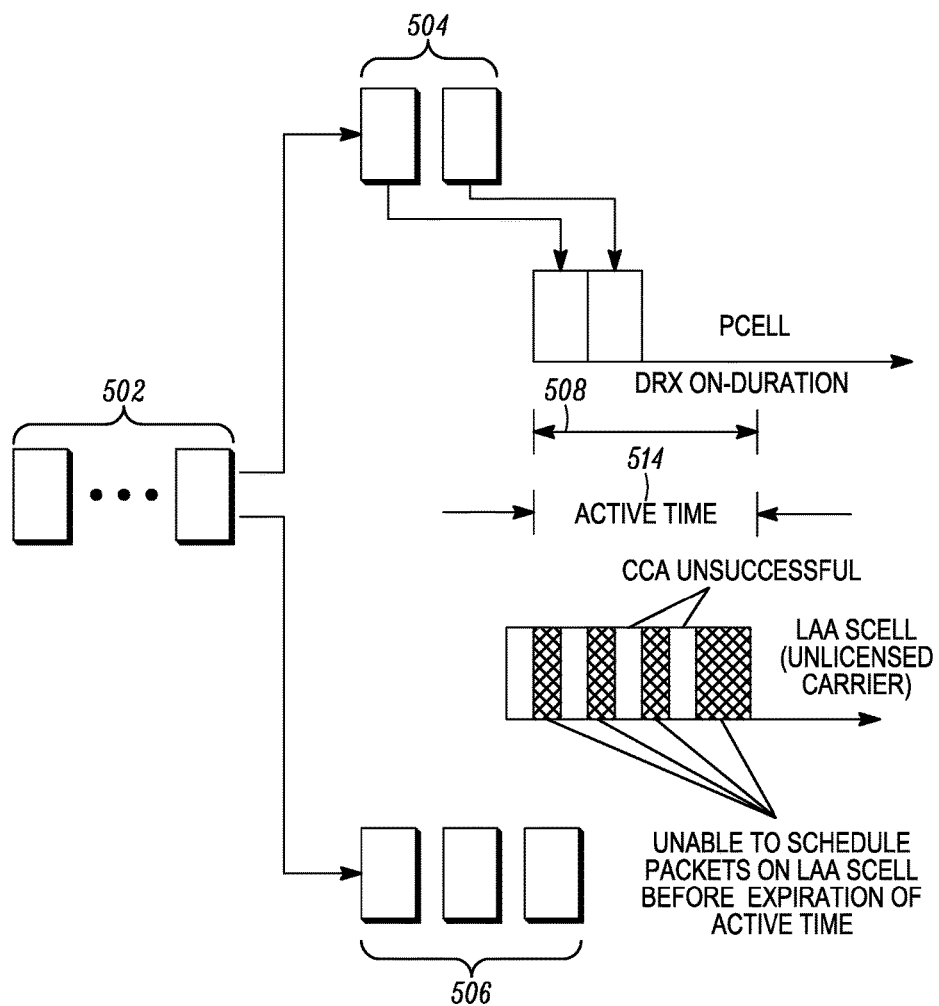
FIG. 5B illustrates Scell operation using an unlicensed network where the eNB is unable to transmit packets via the Scell before the end of the DRX active time.

FIG. 5B illustrates the LAA Scell operation case where the eNB is unable to transmit packets 506 via the LAA Scell before the end of the active time 514, due to the failure of CCA on the Scell carrier. The eNB can conservatively setup a long DRX On-Duration 508, but this reduces the DRX opportunity and can reduce the power saving benefits of DRX.

Described below are several embodiments for improving DRX handling in LTE license assisted access operation.

A first embodiment generally involves extending the DRX active time based upon a CCA failure. On the LAA carrier, the eNB is required to perform a CCA before transmitting a downlink signal (e.g., (E)PDCCH, PDSCH). If the CCA indicates that there is activity on the channel (i.e., channel is occupied by another device), the eNB skips the transmission.

Figure 6:
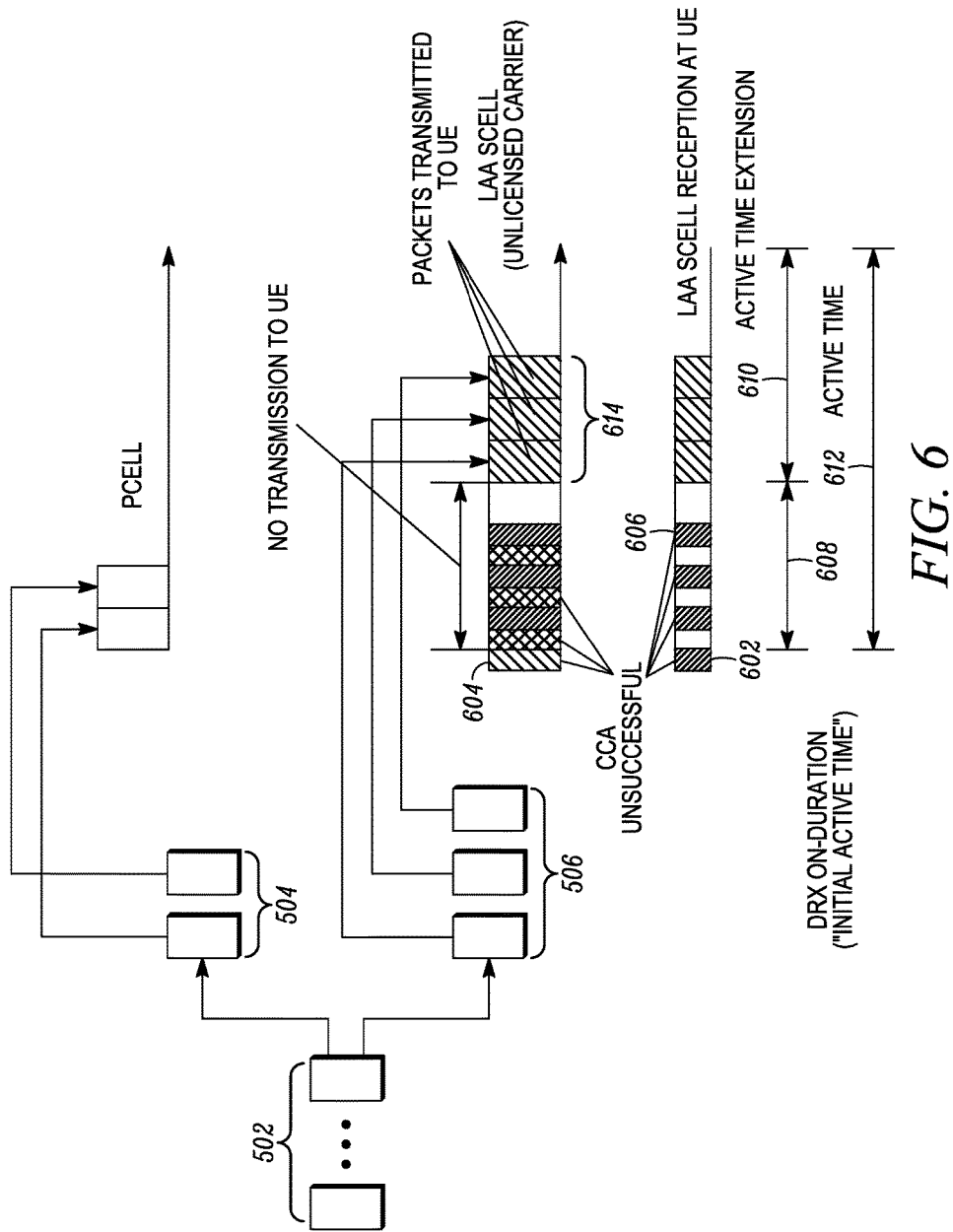
FIG. 6 illustrates operation of an embodiment in which the DRX active time is extended due to failure of a clear channel assessment performed at the UE.

Referring now to FIG. 6, in one example the UE performs CCA (preferably in the same time period as the CCA performed by the eNB) during, or just before, each subframe during the initial active time corresponding to the DRX On-Duration 608, during which time the UE is monitoring for (E)PDCCH. If the CCA indicates that the channel is busy (e.g., CCA 602), the UE extends the active time 612 by one subframe. Correspondingly, if the CCA performed by the eNB (e.g., CCA 604) indicates that the channel is busy, the eNB assumes that the UE has extended its active time 612 by one subframe. Alternatively, instead of one subframe, the active time extension can be a predefined 'n' number of subframes. Furthermore, the extension can be performed based on the CCA indicating that the channel is busy during one or more of the subframes close to the end of the On-Duration (i.e., the "initial active time") such as CCA 606. After a successful CCA (not shown), the packets 506 may then be transmitted from the Scell to the UE, shown here as transmission 614. While such transmission 614 is shown as occurring entirely within the active time extension 610, such transmission can occur at any time during the active time, including during later portions of the initial active time, or during the extended active time subsequent to the initial active time.

The extension of the active time may apply to (a) just the LAA carrier and possibly the carrier carrying the corresponding PUCCH (i.e., PUCCH associated with the downlink LAA carrier for the UE), or (b) it may apply to all carriers. The CCA procedure has to be performed (at both the UE and the eNB) prior to the subframe in which the eNB expects to transmit or at the start of the subframe in which the eNB expects to transmit.

It should be noted that, although described above in the context of downlink transmissions from the eNB to the UE, the technique is also useful for uplink transmissions from the UE to the eNB.

When CCA is performed independently at both the UE and the LAA eNB, it is possible that one of the CCA procedures succeeds and the other fails. If the CCA at the eNB succeeds (e.g., CCA 604) and the CCA at the UE fails (i.e., there is a node that is visible to the UE but hidden to the eNB), the UE may apply an active time extension, but the eNB does not extend its active time, and may only attempt a transmission to the UE within the initial active time (i.e., during the DRX On-Duration 608). This transmission will nonetheless occur within the respective active times of both the UE and eNB, and thus, the transmission will be accomplished before the UE goes into DRX.

Conversely, if the CCA at the eNB fails and the CCA at the UE succeeds (i.e., there is a node that is visible to the eNB but hidden to the UE), the eNB may apply an active time extension, but the UE does not extend its active time since its CCA succeeded. However, the eNB assumes that the UE has extended its active time and may attempt a transmission to the UE. If the UE has already gone into DRX, this transmission will fail.

In order to avoid the above problem, different energy detection thresholds may be used for the CCA procedure at the eNB relative to the CCA procedure at the UE. That is, a more aggressive threshold (a lower threshold) may be used by the UE for its CCA procedure. The use of a lower threshold at the UE makes it unlikely that there is a CCA success at the UE when there is a CCA failure at the eNB. The threshold used by the UE can be selected by the eNB and signaled to the UE. Such selection may be based upon, for example, the estimated distance between the UE and the eNB (e.g., using signal measurements such as RSRP, etc.). Alternatively, the eNB can use a more relaxed threshold (a higher threshold) than a default threshold used by the UE.

Figure 7:
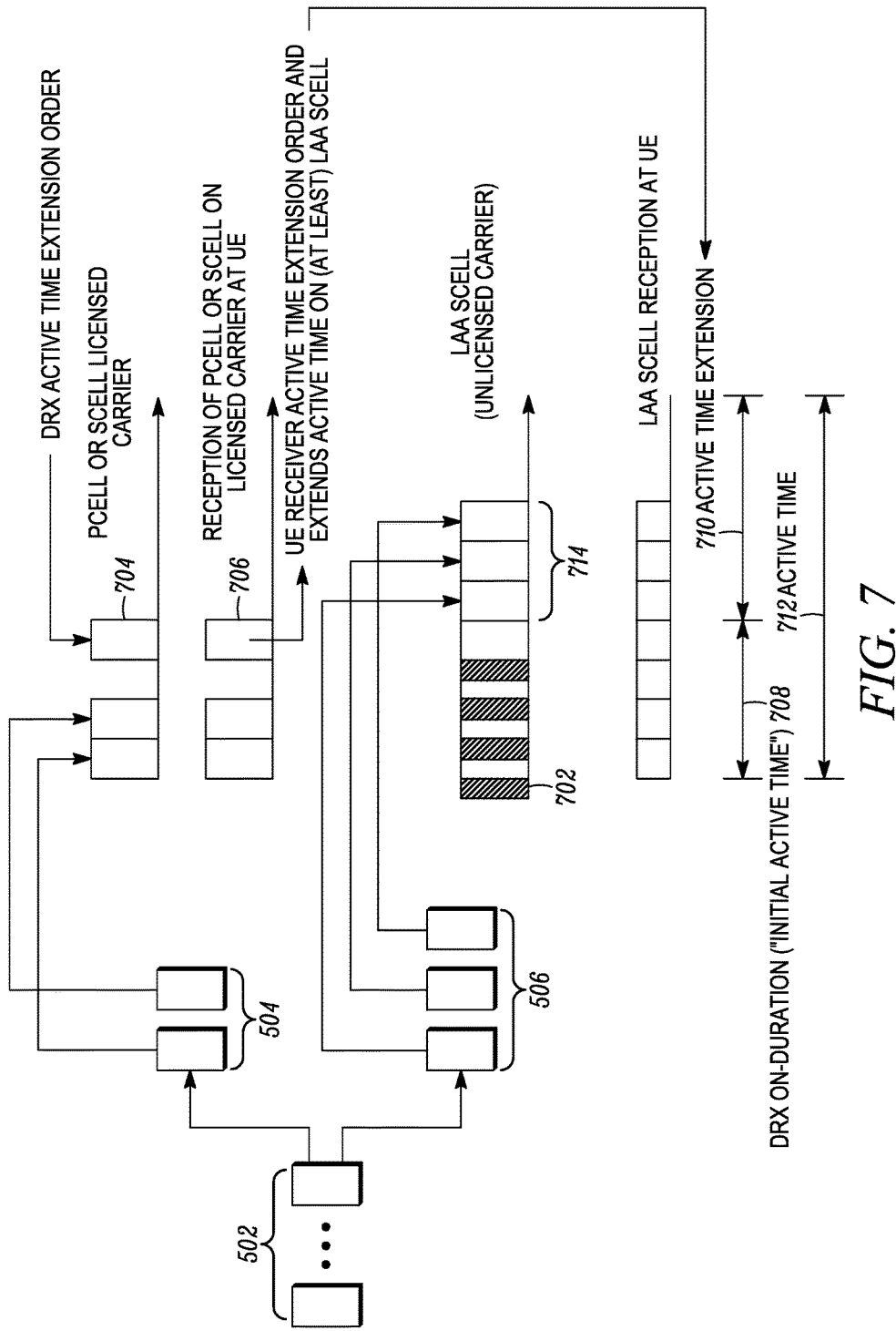
FIG. 7 illustrates operation of an embodiment in which the DRX active time is extended based upon a network command or order.

Referring now to FIG. 7, another embodiment generally involves extending the DRX active time based upon an indication on another carrier. In one example, the eNB performs CCA at the LAA Scell (e.g., CCA 702 during the initial active time 708) prior to transmitting signals to the UE. If the eNB does not find adequate number of subframes in which it can transmit to the UE on the LAA Scell (due to the CCA procedure indicating that the carrier is occupied), the eNB transmits to the UE via a cell on a licensed carrier (e.g., Pcell) an order 704 to extend the active time on the LAA Scell. The order (i.e., command; message) may include the number of subframes by which the active time 712 should be extended. The UE receives the order to extend the active time (labeled 706), and extends the active time 712 accordingly. Alternatively, the eNB may transmit the order to the UE to extend the active time via the LAA Scell itself at a time when the carrier is not occupied.

As in the previous approach, the extension 710 of the active time 712 may apply to (a) just the LAA carrier and possibly the carrier carrying the corresponding PUCCH (i.e., PUCCH associated with the downlink LAA carrier for the UE), or (b) it may apply to all carriers. Although described above in the context of downlink transmissions from the eNB to the UE, the technique is also useful for uplink transmissions from the UE to the eNB.

To be able to transmit the 'DRX Active Time Extension Order' via the Pcell, the entity controlling the Pcell has to be made aware of the CCA failures on the LAA Scell. One of the expected modes of operation of LAA consists of the Pcell being operated by a macro eNB and the LAA Scell being operated by a low power node (e.g., an indoor transmission point or a small cell). In such a case, transmitting the 'DRX Active Time Extension Order' as shown requires signaling between the node operating the LAA Scell (referred to as LAA Scell eNB) and the macro cell operating the Pcell. An example of such signaling may be described as follows:

1. The LAA Scell eNB performs CCA at the LAA Scell prior to transmitting signals to the UE.
2. If the LAA Scell eNB does not find adequate number of subframes in which it can transmit to the UE on the LAA Scell (due to CCA being unsuccessful). The LAA Scell eNB then transmits an indication to the macro eNB controlling the Pcell that an active time extension is needed and includes a number of subframes of extension.
3. The macro eNB receives the indication from the LAA Scell eNB and transmits to the UE a 'DRX active time extension order' including the number of subframes of extension.
4. The UE receives the order and extends the active time accordingly.

The above scheme where information related to the need for active time extension is exchanged between the eNBs is preferred over a scheme where the LAA Scell eNB sends un-transmitted packets to the macro eNB, as that requires a higher capacity backhaul communication link.

In some embodiments, the active time extension can be handled differently for licensed and unlicensed carriers. A Cell Radio Network Temporary Identifier (CRNTI) is a unique identifier of the UE when connected to an eNB. In one example, if a control channel (e.g., PDCCH) with CRNTI for the UE is received by that UE from a cell on a licensed carrier (Pcell or Scell) such a command may serve to extend the active time for all the configured cells (for that UE) on licensed carriers.

In some embodiments, if a UE receives a data packet or downlink control information (DCI) on a control channel from the eNB (e.g., a PDCCH with a CRNTI) on an LAA Scell, the active time is extended for that LAA Scell but not for the other carriers.

In some embodiments, the eNB signals an indication of a start of transmission burst (e.g., preamble transmission following successful CCA) with transmission burst configuration parameters such as the transmission burst duration (N_Tx_Burst) and/or transmission burst subframe configuration. Based on the received transmission burst configuration signaling, if a UE receives a data packet or a DCI on a control channel from the eNB (e.g., a PDCCH with a CRNTI) on an LAA Scell towards the end of the transmission burst (e.g., in last X subframes) (and possibly towards the end of the DRX ON duration for the UE), the active time is extended for that LAA Scell, to account for the discontinuous transmission regulatory requirements on the LAA Scell, idle period, and the need for the eNB to perform LBT before reinitiating transmission. The amount of active time extension (i.e., number of subframes by which the active time should be extended) may be indicated in the transmission burst configuration signaling in the preamble transmission.

In some embodiments, the DRX active time extension order is sent on the LAA Scell if the eNB estimates that an inadequate number of subframes are available in which it can transmit to the UE on the LAA Scell. In one alternative, the DRX active time extension order indication may be signaled in a DCI on a control channel that does not include resource assignment for the UE. The DCI may include DRX active time extension indication for a group of UEs (e.g., DCI on PDCCH with DRX-RNTI) with the DCI comprising an indication for each UE in the group of UEs. The indication may specify whether active time extension is to be applied for the UE and the amount of active time extension for the UE. The UE is configured by higher layer on the position (e.g., bits) within the DCI that corresponds to DRX active time extension indication for that UE. In another alternative, the DRX active time extension order indication may be signaled in a DCI on a control channel together with resource assignment message for a data packet for a UE. This may be achieved by using one or more bits or states in the DCI for signaling the indication.

In some embodiments, if the UE's CCA on the LAA Scell is not successful during the DRX On-Duration, the active time is extended for the LAA Scell (but not for the other carriers).

As a further modification of the above procedures, the active time of all LAA Scells can be extended if the active time on any one LAA Scell is extended.

While some of the description (and corresponding figures) of techniques presented above may be described in the context of a UE device, the techniques can also be used when the wireless communication device is an infrastructure node (i.e., base station) such as a Wi-Fi access point, an eNB or a small cell. For example, the wireless communication device can be an infrastructure node that supports Wi-Fi operation on one or more carriers and LTE LAA operation on one or more carriers. The wireless communication device can also be an infrastructure node that supports LTE LAA operation on two or more carriers. Moreover, various DRX techniques described herein may also be utilized with other wireless technologies that do not necessarily utilize separate control channels for resource allocation. For example, Wi-Fi transmissions include information in a packet header to identify the intended recipient.

The various techniques described above are contemplated to be used alone or in combination. In addition, while methods and techniques are generally described above, various wireless communication devices (such as, for example, UE's and eNB's) and systems that are operable to perform such methods and techniques are also contemplated.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the scope of the invention as defined by the claims in this application or in any application claiming priority to this application. Thus, it is intended that such claims be interpreted to embrace all such further modifications, changes, rearrangements, substitutions, alternatives, design choices, and embodiments.

What is claimed is:

1. A method in a mobile device for communicating data packets with a first cell operating on an unlicensed carrier, said method comprising:

monitoring, in the mobile device, for a signal addressed to the mobile device from the first cell during an active time having an initial duration equal to an initial active time;

extending, in the mobile device, the active time in response to a determination that the unlicensed carrier is occupied during at least a portion of the initial active time; and communicating a data packet between the mobile device and the first cell during the extended active time when the unlicensed carrier is not otherwise occupied.

2. The method as in claim 1 wherein said communicating a data packet between the mobile device and the first cell during the extended active time comprises:

receiving, from the first cell, a control channel indicating a transmission of a data channel to the mobile device; and decoding, in the mobile device, the data packet from the data channel.

3. The method as in claim 1 wherein said communicating a data packet between the mobile device and the first cell during the extended active time comprises:

receiving, from the first cell, a control channel indicating resources for transmission of a data packet by the mobile device; and transmitting the data packet using the indicated resources.

4. The method as in claim 1 further comprising:

further extending, in the mobile device, the extended active time in response to a determination that the unlicensed carrier is occupied during at least a portion of the extended active time subsequent to the initial active time.

5. The method as in claim 1 wherein:

said determination that the unlicensed carrier is occupied is based upon a clear channel assessment (CCA), performed in the mobile device, that the unlicensed carrier is occupied; and said communicating a data packet between the mobile device and the first cell comprises receiving the data packet from the first cell.

6. The method as in claim 5 wherein:

the CCA performed in the mobile device utilizes a CCA threshold that is more aggressive than a CCA threshold utilized by the first cell to perform a corresponding CCA at substantially the same time.

7. The method as in claim 1 further comprising:

determining whether the unlicensed carrier is occupied at or prior to each subframe in the initial active time; and extending the active time by one subframe for each subframe of the initial active time during which the unlicensed carrier is occupied.

8. The method as in claim 1 wherein the extended active time is applied to operation with all configured cells for the mobile device.

9. The method as in claim 1 wherein the extended active time is applied only to operation with the first cell.

10. The method as in claim 1 wherein the determination that the unlicensed carrier is occupied comprises receiving, by the mobile device, a command to extend the active time based upon a determination at the first cell that the unlicensed carrier is occupied.

11. The method as in claim 10 wherein:

the command is received from a second cell operating on a licensed carrier.

12. The method as in claim 10 wherein:

the command is received from the first cell on the unlicensed carrier.

13. The method as in claim 10 wherein said communicating a data packet between the mobile device and the first cell comprises:

transmitting the data packet to the first cell in response to receiving a signal addressed to the mobile device from the first cell during the extended active time.

14. The method as in claim 10 wherein said communicating a data packet between the mobile device and the first cell comprises:

receiving the data packet from the first cell in response to receiving a signal addressed to the mobile device from the first cell during the extended active time.

15. The method as in claim 10 further comprising:

extending the active time based upon transmission burst configuration signaling received from a base station.

16. The method as in claim 1 further comprising:

placing at least portions of the mobile device in a reduced power mode at times other than the active time, wherein the active time comprises a discontinuous reception (DRX) active time.

17. A method in a base station for communicating data with a mobile device using an unlicensed carrier, said method comprising:

configuring the mobile device with a first cell on an unlicensed carrier and a second cell on a licensed carrier;

determining whether the unlicensed carrier is occupied during an active time for the mobile device, said active time having an initial duration equal to an initial active time; transmitting, in response to determining that the unlicensed carrier is occupied during at least a portion of the initial active time, a command to the mobile device to extend the active time; and then communicating, during the extended active time, a data packet between the mobile device and the first cell when the unlicensed carrier is not otherwise occupied.

18. The method as in claim 17 further comprising:

transmitting, in response to determining that the unlicensed carrier is occupied during at least a portion of the extended active time subsequent to the initial active time, a command to the mobile device to further extend the active time.

19. The method as in claim 17 wherein:

said determining that the unlicensed carrier is occupied is based upon a clear channel assessment (CCA), performed in the first cell, that the unlicensed carrier is occupied; and said communicating a data packet between the mobile device and the first cell comprises transmitting the data packet from the first cell to the mobile device.

20. The method as in claim 19 wherein:

the CCA performed in the first cell utilizes a CCA threshold that is less aggressive than a CCA threshold utilized by the mobile device to perform a corresponding CCA at substantially the same time.

21. The method as in claim 17 further comprising:

determining whether the unlicensed carrier is occupied at or prior to each subframe in the initial active time; and extending the active time by one subframe for each subframe of the initial active time during which the unlicensed carrier is occupied.

22. The method as in claim 17 further comprising:

transmitting, in response to determining that the unlicensed carrier is occupied during at least a portion of the initial active time, a command to all mobile devices configured for the first cell, to extend the respective active time for each such mobile device.

23. The method as in claim 17 wherein:
the command includes an indicated number of subframes to extend the active time.

24. The method as in claim 17 wherein:
the command is transmitted to the mobile device from the second cell on the licensed carrier.

25. The method as in claim 17 wherein:
the command is transmitted to the mobile device from the first cell on the unlicensed carrier.

26. The method as in claim 17 wherein said communicating a data packet between the mobile device and the first cell comprises:
receiving the data packet from the mobile device.

27. A mobile device for communicating data packets with a first cell operating on an unlicensed carrier, said mobile device comprising:
a transceiver; and
a processor coupled to the transceiver;
wherein the mobile device is operable to:
monitor for a signal addressed to the mobile device from the first cell during an active time having an initial duration equal to an initial active time;
extend the active time in response to a determination that the unlicensed carrier is occupied during at least a portion of the initial active time; and
communicate, in response to receiving a signal addressed to the mobile device from the first cell during the extended active time, a data packet between the mobile device and the first cell when the unlicensed carrier is not otherwise occupied.

28. The mobile device as in claim 27 wherein the mobile device is operable to:
further extend the extended active time in response to a determination that the unlicensed carrier is occupied during at least a portion of the extended active time subsequent to the initial active time.

29. The mobile device as in claim 27 wherein:
said determination that the unlicensed carrier is occupied is based upon a clear channel assessment (CCA), performed in the mobile device, that the unlicensed carrier is occupied.

30. The mobile device as in claim 29 wherein:
the CCA performed in the mobile device utilizes a CCA threshold that is more aggressive than a CCA threshold utilized by the first cell to perform a corresponding CCA at substantially the same time.

31. The mobile device as in claim 27 wherein the mobile device is operable to:
determine whether the unlicensed carrier is occupied at or prior to each subframe in the initial active time; and
extend the active time by one subframe for each subframe of the initial active time during which the unlicensed carrier is occupied.

32. The mobile device as in claim 27 wherein the determination that the unlicensed carrier is occupied comprises receiving, by the mobile device, a command to extend the active time based upon a determination at the first cell that the unlicensed carrier is occupied.

33. The mobile device as in claim 32 wherein said data packet communicated between the mobile device and the first cell is received from the first cell.

34. The mobile device as in claim 27 wherein the mobile device is operable to:
place at least portions of the mobile device in a reduced power mode at times other than the active time, wherein the active time comprises a discontinuous reception (DRX) active time.

* * * * *